United States Patent [19]

Gibson

[11] 4,426,107
[45] Jan. 17, 1984

[54] DOOR LOCKING MECHANISM

[75] Inventor: James F. Gibson, Marietta, Ga.

[73] Assignee: Lockheed Corporation, Burbank, Calif.

[21] Appl. No.: 174,499

[22] Filed: Aug. 1, 1980

[51] Int. Cl.³ .............................................. E05C 13/10
[52] U.S. Cl. .................................................... 292/201
[58] Field of Search ....................... 292/201, 144, 153; 70/283

[56] References Cited

U.S. PATENT DOCUMENTS

| | | | |
|---|---|---|---|
| 3,078,704 | 2/1963 | Rifkin | 292/144 X |
| 3,624,761 | 11/1971 | Kohn | 292/144 X |
| 3,638,983 | 2/1972 | Flournoy et al. | 292/144 X |
| 3,677,043 | 7/1972 | Cox | 70/283 X |

Primary Examiner—Richard E. Moore
Attorney, Agent, or Firm—John J. Sullivan

[57] ABSTRACT

A door locking mechanism is formed by a pair of locking elements (19 and 20) carried by a bolt (18) on the door (12) and on the adjacent structure (10) respectively. The locking element (19) is movable into and out of engagement with the lock receptacle (20) by reciprocation of the bolt (18). Such movement is restricted and controlled by a rotary sleeve (23) having lands (22) which coact with and are complemental to mating lugs on the bolt (18) which assure and maintain the locked and unlocked condition of the door (12) through the locking elements (19 and 20). Actuators (15' and 31) are provided to rotate the sleeve and reciprocate the bolt (18) respectively in a selected sequence whereby door locking and unlocking is accomplished.

5 Claims, 8 Drawing Figures

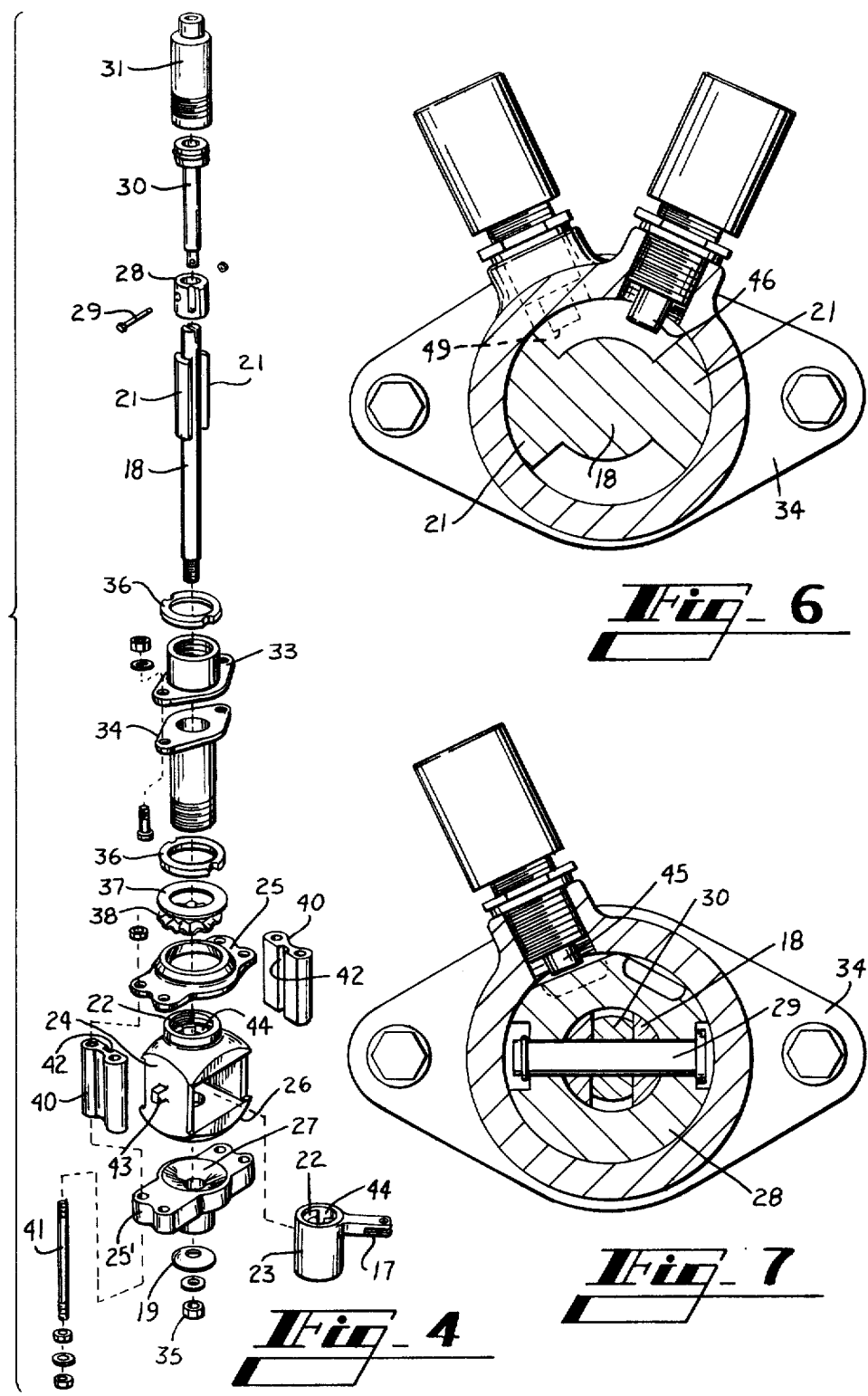

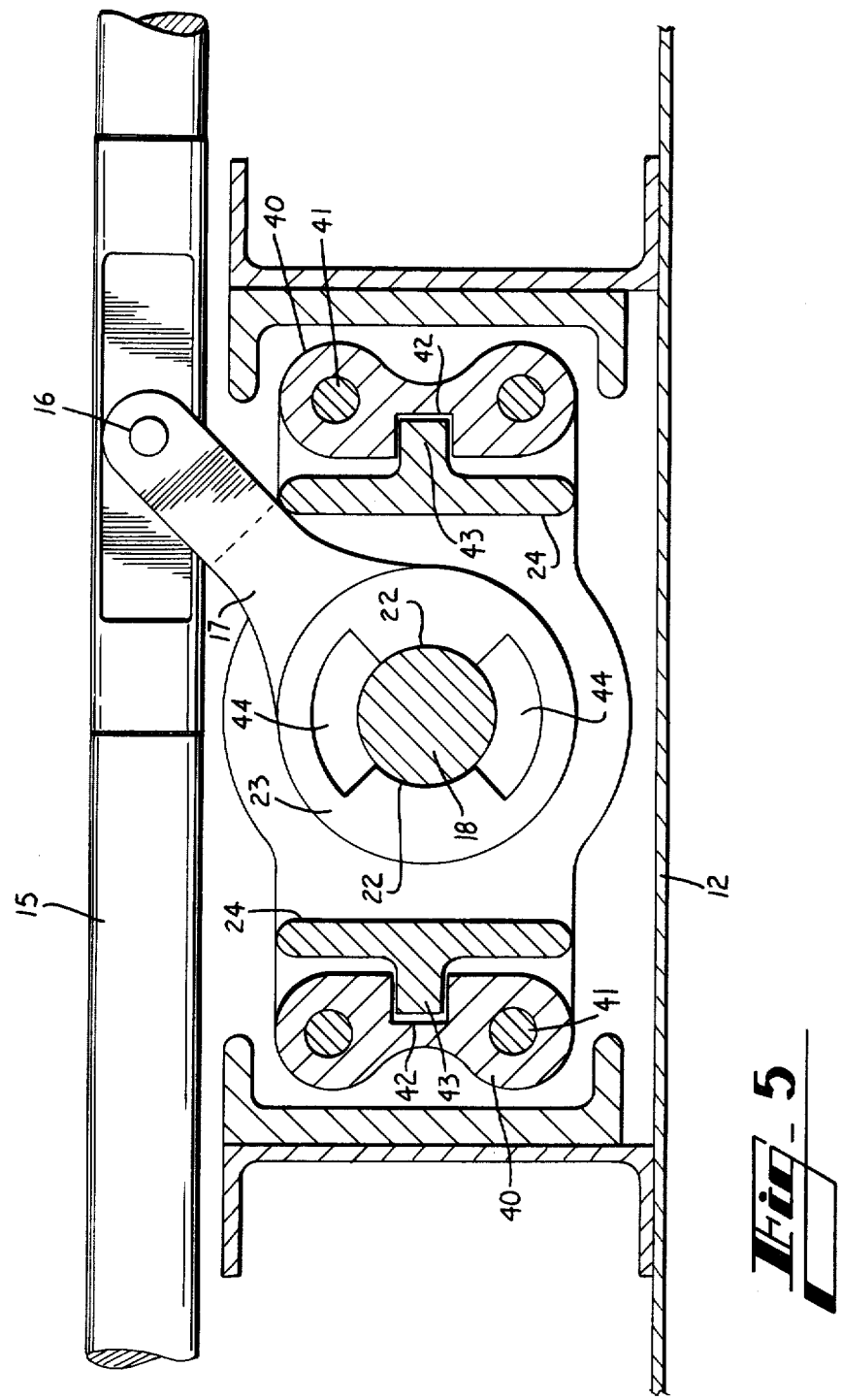

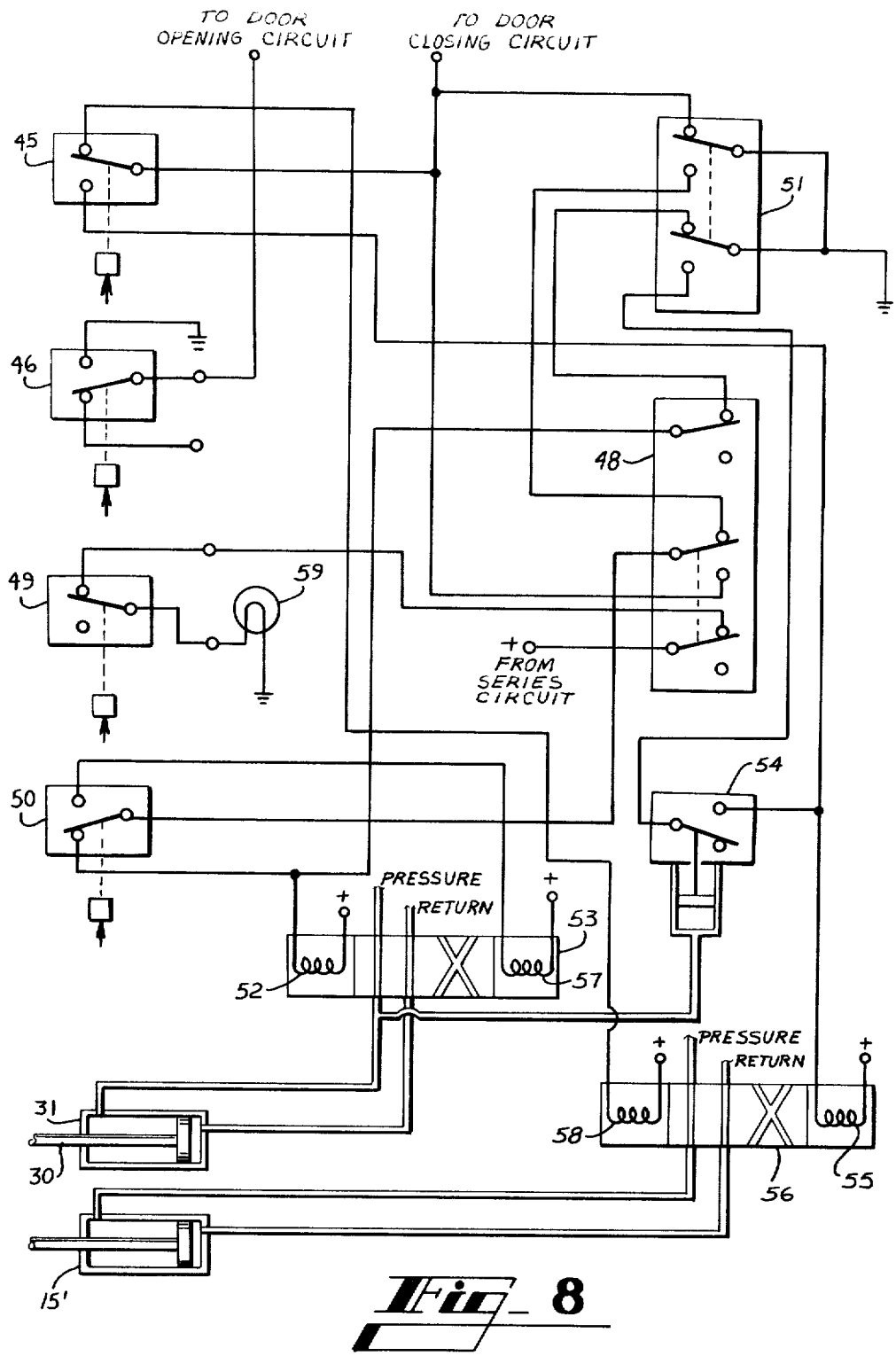

DOOR LOCKING MECHANISM

TECHNICAL FIELD

This invention relates to locking mechanisms and particularly to locking mechanisms especially designed and adapted for doors on pressurized compartments such as employed on aircraft.

Pressurized aircraft doors when closed carry loads which act in the direction of the wall or skin in which they are located and as such function as hoop tension elements. It is, therefore, essential that the locking mechanism establishes a tension load path whereby the door serves as a structural connecting member. This requires an assurance of precise alignment, sealed closure and positive locking lest air leakage occur upon pressurization resulting in the door being blown out.

BACKGROUND

The best of the present day pressurized aircraft door systems employ over-center hooks as the locking elements. Such hooks are pivoted on an eccentric shaft. When the hook has engaged a pin the eccentric shaft is rotated which causes the hook to pull the door closed. When the shaft has rotated fully, the line between the hook pivot point and the pin center has passed the center of the eccentric shaft. Under ideal conditions, tension loads on the hook try to rotate the eccentric shaft in the locking direction. Frequently, however, small errors in rigging the eccentric shaft allow one or more of the hooks to stop prior to going over-center. Under these conditions, tension loads on the hook tend to unlock the system. These slight variations in position from locked to unlocked may not be visually obvious. Catastrophic failures have occurred due to unlocking under load in this manner.

PRIOR ART

The following U.S. patents disclose the state of the art as best known:
U.S. Pat. No. 2,235,949 issued Mar. 25, 1941 to Shaw
U.S. Pat. No. 2,797,884 issued July 2, 1957 to Peed
U.S. Pat. No. 3,085,297 issued Apr. 16, 1963 to Linderfelt
U.S. Pat. No. 3,099,205 issued July 30, 1963 to Lovrinch
U.S. Pat. No. 4,180,943 issued Jan. 1, 1980 to Smith et al While Peed, Smith et al and Linderfelt all disclose locking mechanisms on pressurized door systems of aircraft and are representative in this regard, the essentials of each of these prior art mechanisms are totally dissimilar from those of the present mechanism. It is believed that Shaw and Lovrinch include elements somewhat akin to those contemplated by the present invention. However, each of these patented devices lacks the salient features of the instant invention.

DISCLOSURE OF INVENTION

The locking mechanism herein proposed was conceived as a means of minimizing habitual problems encountered in the closing, sealing and positive locking of relatively large pressurized aircraft cargo doors. It has, however, a broad range of application for doors and especially doors which carry pressurization loads and function as hoop tension elements.

Salient features of the present locking system as applied to the solution of known, recurring door closure and locking problems may be summarized as follows:

a. The positive locking feature will not allow unlocking under load up to the point of material failure. The load produces no force tending to move the lock element. As the load increases, the frictional resistance to movement increases.

b. The alignment and closure capability assures that if the door is closed within the range of a "door closed" indicator switch and the mechanism locking is completed, the proper door/sill relationship has been achieved. If by some malfunction the mechanism locking is completed prior to the door coming fully closed, an obstruction will hold the door open far enough to prevent fuselage pressurization.

c. The closure force is sufficient to overcome door/sill deflections due to cargo being located adjacent the cargo door. This closure force also provides positive seal compression as the door is pulled up.

d. The mechanism incorporates a tension load path in which a bolt acts as the structural connecting member. This bolt configuration is such that it minimizes the possibilities of the bolt experiencing shear or bending loads which would significantly reduce the tension capability and fatigue life.

e. The bolt configuration is also such that it acts as compensation for tolerance accumulations in both longitudinal and lateral directions.

f. The lock concept has been developed to minimize the rigging complexity and to desensitize the adjustments that are provided.

More specifically, the locking mechanism herein proposed is formed by a pair of locking elements, one carried by the door and the other carried by the adjacent structure. One of these locking elements is movable into and out of engagement with the other by reciprocating action. Such movement is restricted and controlled by complemental, mating lugs and lands on components of the movable locking element which assure and maintain the locked and unlocked condition of the door through the locking elements. Actuators are provided to rotate the sleeve and reciprocate the relatively movable locking element in a selected sequence whereby the door locking and unlocking is accomplished.

BRIEF DESCRIPTION OF DRAWINGS

The details of the invention will be described in connection with the accompanying drawings, wherein:

FIG. 4 is an exploded view in perspective of the locking mechanism to show the individual parts thereof;

FIG. 5 is a section taken along line 5—5 of FIG. 3;

FIG. 6 is a section taken along line 6—6 of FIG. 3;

FIG. 7 is a section taken along line 7—7 of FIG. 3; and

FIG. 8 is an electrical schematic by which the door opening and door closing sequence is effected.

DETAILED DESCRIPTION OF PREFERRED EMBODIMENT

Figure 1:
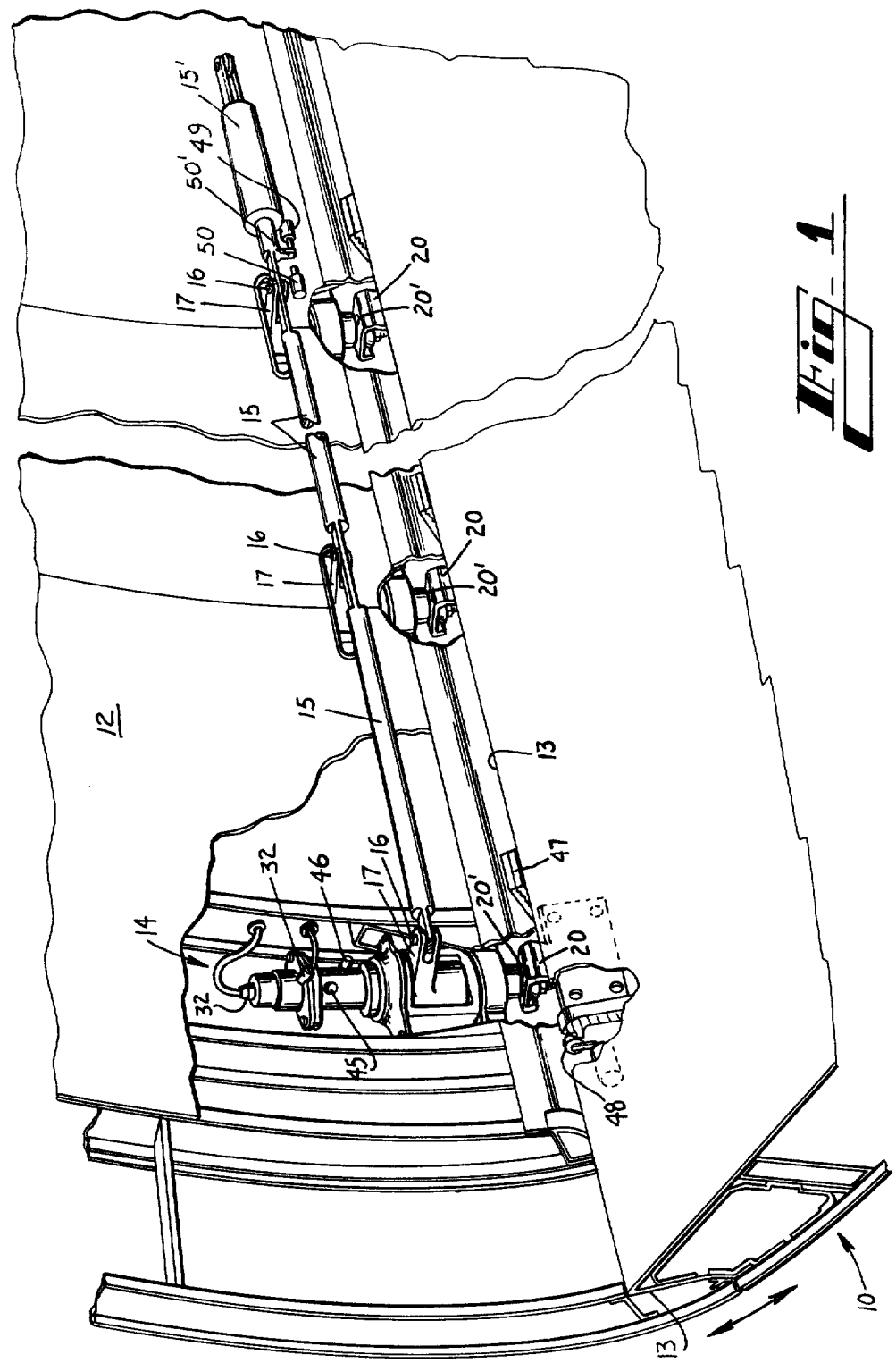
FIG. 1 is a perspective view of a portion of an aircraft fuselage at the junction between the cargo hold floor and an adjacent door disposed in the closed position to show a locking mechanism constructed in accordance with the teachings of this invention associated therewith, parts of the door and the aircraft structure having been broken away to reveal elements of the locking mechanism when the door is in the closed position.
Figure 2:
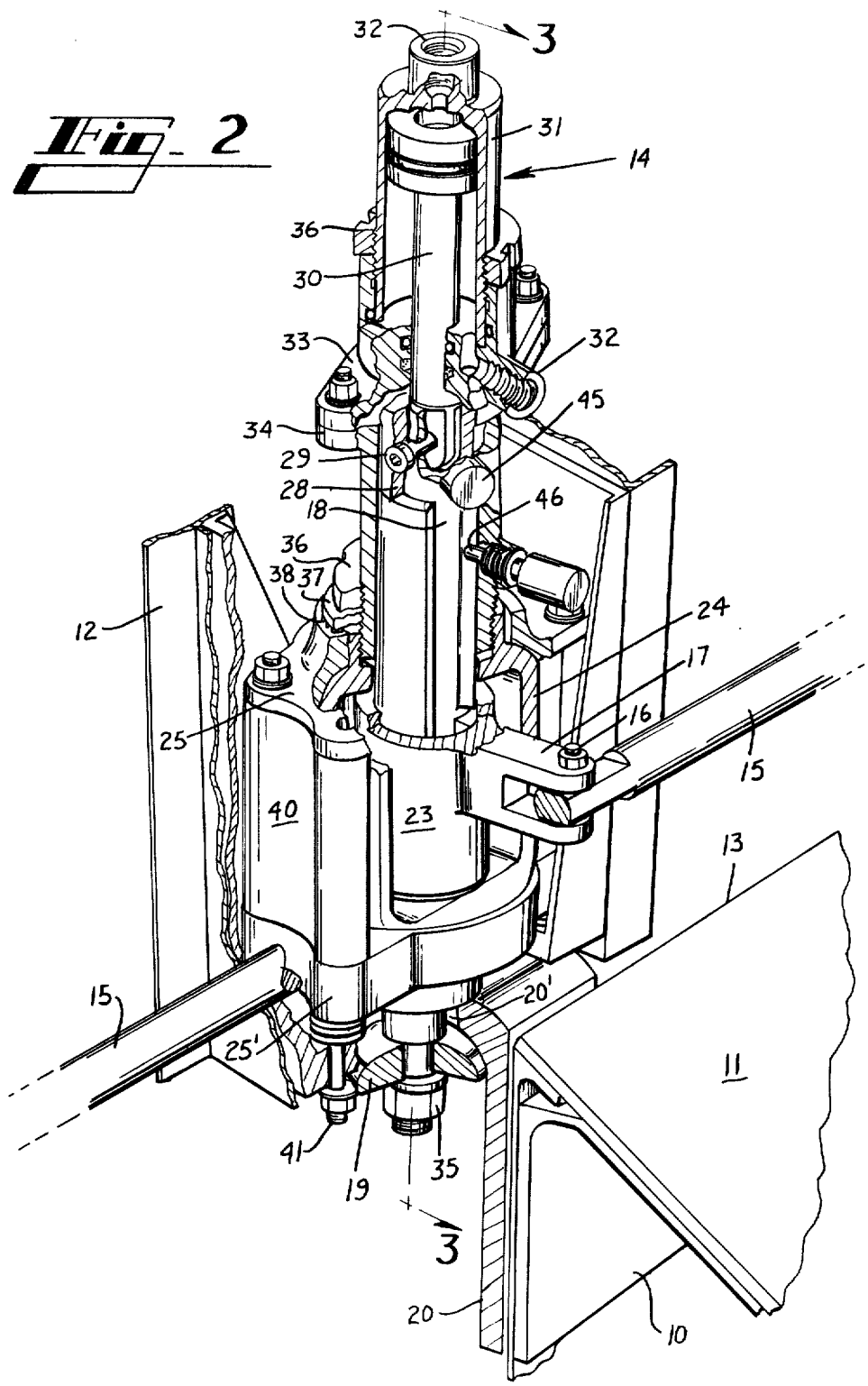
FIG. 2 is a perspective view of one of the locking mechanisms and the adjacent door and aircraft structure shown in FIG. 1 with parts broken away to reveal underlying elements.
Figure 3:
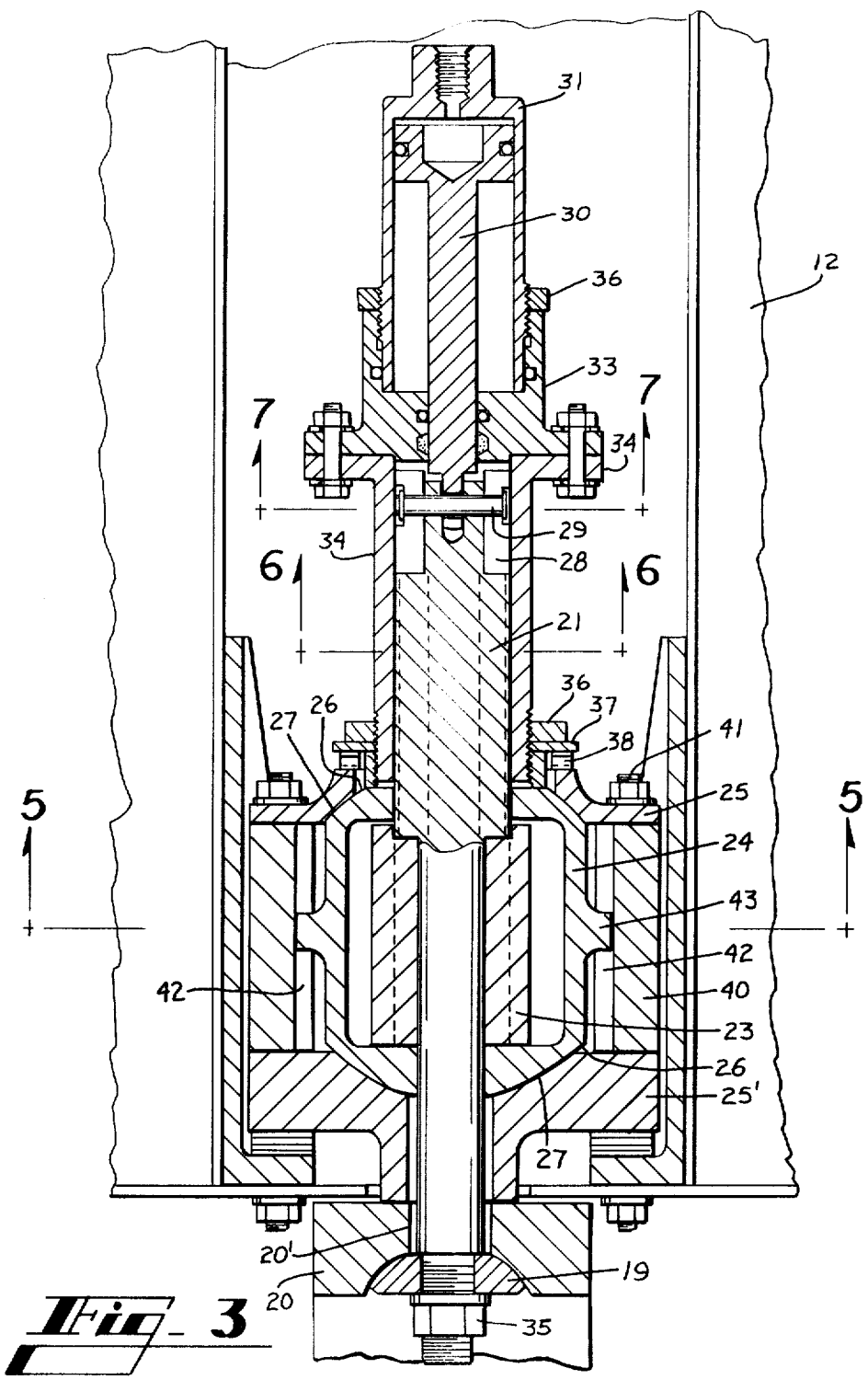
FIG. 3 is a section taken along the line 3—3 of FIG. 2 to show the assembly which comprises each locking mechanism.

Referring more particularly to the drawings 10 designates a portion of an aircraft defining an interior surface such as a cargo hold floor 11 against one edge of which a removable closure or door 12 abuts. The door 12 is mounted following conventional practice to swing in the direction of the arrow in FIG. 1 from the closed to the open position to permit access to the interior of the aircraft 10. In the closed position shown in FIG. 1 a junction 13 is formed between the abutting edges of the floor 11 and door 12.

In order to secure the door 12 to the aircraft 10 in the closed position a number of locking mechanisms 14 are provided at spaced intervals along the length of the junction 13. Such locking mechanisms 14 are all identical one with the other so that a description of one should suffice for a clear understanding of the invention. The several mechanisms 14 are interconnected one to the next for simultaneous, i.e. gang, operation by a push-pull rod 15 pivotally connected as at 16 to an actuator 17 carried by each mechanism 14. A power cylinder 15' or the equivalent may be employed to move the rod 15.

The primary locking element of each mechanism 14 is a bolt 18. This bolt 18 is aligned with the principle locking load direction which acts parallel to the outer surface or skin line of the door 12. The load path to the aircraft structure 10 is provided by a spherical washer 19 which engages a lock receptacle 20 carried by the aircraft 10 adjacent the edge of the floor 11. The load path to the door structure 12 is provided from the bolt 18 by means of and through a pair of lugs 21 carried by the bolt 18 through lands 22 on the interior wall of a lock sleeve 23 and into a housing 24 for the lock sleeve 23. The housing 24 in turn nests between a support cap 25 and base 25', being provided with spherical surfaces 26 complemental to mating surfaces 27 on adjacent faces of the cap 25 and base 25'. The lock sleeve 23 carries a laterally extending arm which is the actuator 17 by which the several mechanisms 14 are gang-operated as stated above.

At its outer or upper end the bolt 18 carries a cam ring 28 secured thereto by a pin 29 which also connects the outer end of a piston 30. The other end of the piston 30 is mounted in the customary manner in a cylinder 31 which includes fluid ports 32 adjacent its opposite ends for the delivery of fluid under pressure from an appropriate source (not shown) to act on opposite sides of the piston 30 in the usual fashion.

The cylinder 31 is secured in place by a cap 33 threaded on the end thereof and through which it is bolted to a switch housing 34 with the shank of the bolt 18 extending through the switch housing 34, lock housing 24, its cap 25 and base 25' and washer 19. The end of the bolt 18 passing through the washer 19 is threaded to receive a nut 35 to maintain the assembled locking mechanism parts. Such assembly is assured and optimized by means of appropriate devices such as lock rings 36, washers 37 and centering means 38 as commonly employed for obvious purposes. In addition, a spacer 40 comprised of two elements adapted to abut opposite sides of the lock housing 24 and interconnect the cap 25 and base 25' supports as well as the housing 24 thereto through the use of bolt and nut means 41.

The facing surfaces of the spacer elements 40 are each grooved as at 42 throughout its length to receive and accommodate a projection 43 on each adjacent exterior side of the housing 24 when assembled as described. Internally, the housing 24 as well as the lock sleeve 23 is slotted, as at 44, defining the lands 22 and through which the bolt lugs 21 pass.

OPERATION OF THE PREFERRED EMBODIMENT

The opening sequence of the door 12 is initiated by a longitudinal movement of the rod 15 which simultaneously rotates all of the lock sleeves 23 of the several door locking mechanisms 14. A 90° rotation of each lock sleeve 23 aligns the slots 44 therein with the lugs 21 on the associated bolt 18. When each lock sleeve 23 has reached this position the lock cylinder 31 associated therewith is pressurized to extend. This is effected by a limit switch 50 when engaged by a striker 50' carried by the power cylinder 15' and operatively connected to the fluid pressure control valve in conventional manner.

Upon extension of the cylinder 31 the bolt lugs 21 slide through the lock sleeve slots 44 until the limit of travel is reached with the lugs 21 bearing on the lock housing 24 through the lands 22 which are approximately coextensive with the lugs 21 at this time. When this position is reached, the spherical washer 19 has moved out of engagement with the lock receptacle 20 and an extended limit switch 46 is actuated by the cam ring 28. The series circuit completed as all of the switches 46 actuate, arms the door actuators and the door opening movement begins as each bolt 18 is moved away from the lock receptacle 20 with the shank thereof passing through a slot 20' in the receptacle 20. The power drives for movement of the door 12 to and from the fully open position as well as the locks to secure the door 12 in its fully open position are standard well-known mechanisms and are not shown as they per se form no part of the present invention.

As the door 12 closes, each bolt 18 passes through the slot 20' and the spherical washer 19 moves into the lock receptacle 20. As the door 12 approaches, within some predetermined distance of a mechanical door stop 47, a door closed indicator switch 48 is actuated thereby and the locking sequence is initiated. The several cylinders 31 are pressurized to retract, pulling the associated bolts 18 up whereby the spherical washers 19 seat in their respective lock receptacles 20. As these bolts 18 reach their retracted limit, the lugs 21 have been lifted above the lands 22 of their lock sleeves 23 and an associated retracted limit switch 45 has been actuated by its cam ring 28. Completion of the series circuit through all of these switches activates the power cylinder 15' which rotates the several lock sleeves 23 so that the lands 22 are located under their bolt lugs 21. Actuation of a limit switch 49 by the striker 50' of cylinder 15' causes the fluid pressure control valve to remove pressure from the lock cylinder 31 allowing the bolt lugs 21 to relax against their lock sleeve lands 22. These lands 22 act as a compression block to positively prevent extension of the bolts 18 under load.

Referring now to FIG. 8 specifically, a representative schematic for the electrical and hydraulic operation of the lock system is presented.

The opening sequence for the door 12 is initiated by actuating a door position selector switch 51 from the closed position shown to the open position. This actuation closes a ground path on a retract coil 52 of an extend/retract control valve 53 which pressurizes the cylinder 31 in the retract direction and a pressure actuated switch 54. Activation of the pressure switch 54 provides a ground path for the coil 55 of a control valve 56 which pressurizes the cylinder 15' in the unlock direction.

Initial movement of the cylinder 15' shifts the condition of the indicator switch 49 from the locked position toward the unlocked position. Final movement of the cylinder 15' shifts the condition of the indicator switch 50 to the unlocked position. In the unlocked position the indicator switch 50 provides a ground path for an extend coil 57 of the control valve 53 which pressurizes the cylinder 31 in the extend direction.

Initial movement of the cylinder 31 shifts the condition of the indicator switch 45 from the retracted position toward the unlocked position. Final movement of te cylinder 31 shifts the condition of the indicator switch 46 to the extended position. When the door opening control circuit (not shown) receives positive extended indication from all lock mechanisms, the door 12 begins to open. At this time the door position indicator switch 48 changes condition from closed to open, removing the ground path from the extend coil 57. The door 12 continues to move to the fully open position.

The closing sequence for the door 12 is initiated by actuating the door position selector switch 51 to close. This switch actuation closes ground paths on the extend coil 57 of the control valve 53 and on the unlocked coil 55 of the control valve 56. This action pressurizes the appropriate cylinders 31 and 15' to the extend and unlock positions respectively. Additionally this actuation of the door position selector switch 51 initiates the door closing circuit (not shown) and the door 12 begins to close.

As the door 12 approaches the aircraft 10 at the junction 13, the limit switch 48 is actuated to the door closed position. This switch actuation closes a ground path for the coil 52 of the control valve 53 which causes the cylinder 31 to retract.

Initial movement of the cylinder 31 shifts the condition of the limit switch 46 from the extended position toward the retracted position. Final movement of the cylinder 31 shifts the condition of the limit switch 45 to the retracted position. This latter closure provides a ground path for the lock coil 58 of the control valve 56. This action pressurizes the cylinder 15' in the lock direction.

Initial movement of the cylinder 15' shifts the condition of the indicator switch 50 from the unlocked position toward the locked position. Final movement of the cylinder 15' shifts the condition of the indicator switch 49 to the locked position. A series circuit through all the locked indicator switches 49 causes a door locked indicator lamp 59 to be illuminated and the door position selector switch 51 is then returned to the off position.

I claim:

1. A locking mechanism for a door adapted to close an access opening in a structure comprising:

a bolt mounted on said door for reciprocation in a plane substantially parallel to the external surface of said door;

a lock element on one end of said bolt releasably engageable with a lock receptacle carried by said structure when said door is in the closed position;

at least one lug on a side of said bolt proximate its other end;

a lock sleeve mounted on said door for rotary movement to and from two extreme positions relative to said bolt, said lock sleeve surrounding said bolt adjacent said one bolt end and including a land sized to correspond with each said lug so as, in one extreme position, to vertically align with each said lug and thereby prevent reciprocation of said bolt whereby said lock element is engaged with said lock receptacle when said door is in the closed position and, in the other extreme position, to vertically desalign with each said lug and thereby allow reciprocation of said bolt whereby said lock element is disengaged with said lock receptacle when said door is in the closed position, said lock sleeve further including spherical mating surfaces to compensate for tolerance accumulations in both longitudinal and lateral directions;

an actuator operable on said lock sleeve to rotate it and each of its land into and out of the vertically aligned position aforesaid; and means for extending and retracting said bolt whereby said lock element and said lock receptacle are selectively disengaged and engaged when said means and said actuator are sequentially operated.

2. The mechanism of claim 1 wherein said lock element and said lock receptacle includes spherical mating surfaces to compensate for predetermined misalignment when said door is in the closed position.

3. The mechanism of claim 1 wherein the length of each said land is approximately equal to that of its corresponding lug whereby they are substantially coextensive when said bolt is extended.

4. The mechanism of claim 1 wherein said means includes a hydraulics cylinder connected to said other end of said bolt and a control therefor operable in response to movement of said actuator.

5. The invention of claim 1 wherein a plurality of said locking mechanisms are employed in spaced relation one to another and including a connection common to all of said actuators for the operation thereof in unison.

* * * * *